United States Patent
Khojastepour et al.

(10) Patent No.: US 8,259,831 B2
(45) Date of Patent: Sep. 4, 2012

(54) SUBBAND INDEXING METHODS AND SYSTEMS

(75) Inventors: Mohammad A. Khojastepour, North Brunswick, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 130 days.

(21) Appl. No.: 12/940,725

(22) Filed: Nov. 5, 2010

(65) Prior Publication Data

US 2011/0105058 A1  May 5, 2011

Related U.S. Application Data

(60) Provisional application No. 61/258,402, filed on Nov. 5, 2009, provisional application No. 61/261,552, filed on Nov. 16, 2009.

(51) Int. Cl.
  *H04K 1/10* (2006.01)
  *H04L 27/28* (2006.01)
(52) U.S. Cl. ........ 375/260; 375/267; 375/299; 370/203; 370/208; 455/70
(58) Field of Classification Search .................. 375/260, 375/267, 299; 370/203–211; 455/70
See application file for complete search history.

(56) References Cited

U.S. PATENT DOCUMENTS

2005/0201476 A1* 9/2005 Kim et al. .................. 375/260

OTHER PUBLICATIONS

Cover, T. "Enumerative Source Encoding" IEEE Transactions on Information Theory. vol. IT-19, No. 1. Jan. 1973. pp. 73-77.
Niu, H., et al. "Proposed Text for Sub-Band Indexing (15.3.9.3.1.4) for the IEEE 802.16M/DI-C80216M-09/1720R3" IEEE. Sep. 2009. pp. 1-4. Retrievable from: http://www.ieee802.org/16/tgm/index_older.html#contrib.
Niu, H., et al. "Proposed Text for Sub-Band Indexing (15.3.9.3.1.4) for the IEEE 802.16M/DI-C80216M-09/1720R4" IEEE. Sep. 2009. pp. 1-4. Retrievable from: http://www.ieee802.org/16/tgm/index_older.html#contrib.
Niu, H., et al. "Supporting Document for C80216M-09/1720R3" IEEE. Sep. 2009. (9 Pages). Retrievable from: http://www.ieee802.org/16/tgm/index_older.html#contrib.
Niu, H., et al. "Supporting Document for C80216M-09/1720R4" IEEE. Sep. 2009. (6 Pages). Retrievable from: http://wwvv.ieee802.org/16/tgm/index_older.html#contrib.
Pi, J., et al. "Proposed Text for Sub-Band Indexing (15.3.9.3.1.4)" IEEE. Sep. 2009. pp. 1-3. Retrievable from: http://www.ieee802.org/16/tgm/index_older.html#contrib.

* cited by examiner

*Primary Examiner* — Curtis Odom
(74) *Attorney, Agent, or Firm* — James Bitetto; Joseph Kolodka

(57) ABSTRACT

Methods and systems for indexing subband selections are disclosed. The selected subbands can be represented as a binary sequence and the index can be determined by employing a choose function, where a choose function value for a particular selected bit position is defined by a selection occurrence count of the selected bit position that is chosen from a bit position count of the selected bit position. In particular, the index can be the summation of choose function values for each selected bit position.

15 Claims, 5 Drawing Sheets

SUBBAND INDEXING METHODS AND SYSTEMS

RELATED APPLICATION INFORMATION

This application claims priority to provisional application Ser. No. 61/258,402 filed on Nov. 5, 2009 and provisional application Ser. No. 61/261,552 filed on Nov. 16, 2009, each of which is incorporated herein by reference.

This application is related to commonly assigned application Ser. No. 12/940,761 and commonly assigned application Ser. No. 12/940,777, filed concurrently herewith and incorporated herein by reference.

BACKGROUND

1. Technical Field

The present invention relates to indexing methods and systems and, in particular, to methods and systems for indexing signal options employed in communication links.

2. Description of the Related Art

In many communication systems, control signals are employed between transmitters and receivers to enable the identification and proper setup of a communication link. These signals include, but are not limited to, reference signals and signals conveying information of other signal options such as modulation format, coding rate, precoding index, assigned subbands and so on. For example, certain communication systems dynamically allocate a number of subbands from a set of available subbands to the users it services for purposes of transmitting data to the users on the allocated subbands. It is often desirable to reduce the signaling, as it increases overhead of the communication systems. Different indexing approaches for conveying control information have been described in the literature. For example, with regard to subband indexing, a conventional approach employs a known algorithm that is based on the enumerative source coding problem to compute indices for a set of binary permutations.

SUMMARY

In contrast to existing methods, exemplary embodiments described herein provide relatively simple and efficient means for indexing selected signal options and for determining selected signal options from indices for purposes of establishing a communication link. For example, exemplary implementations are directed to methods for transmitting control information to permit the establishment of a communication link. In accordance with one method, a vector including one or more selected elements representing one or more signal options selected from a plurality of available signal options can be obtained. The vector can be represented as a sequence, which can be a binary sequence, and the elements of the vector can be represented as sequence positions or bit positions. In addition, the signal options can be subbands on which the communication link can be established. Moreover, an index for the vector can be determined by employing the products of the value of each element with a value of a worth function for the element that is dependent on a selection occurrence count of the element and on an element position count of the element. Alternatively or additionally, the index can be determined as the summation of worth function values, where a particular worth function value is dependent on a selection occurrence count of a particular selected sequence position and on a sequence position count of the particular selected sequence position. For example, the worth function can be a choose function that is defined by a selection occurrence count of a particular selected bit position that is chosen from a bit position count of the particular selected bit position. Alternatively or additionally, the index can be a summation of worth function values for each selected element that are dependent on an element position count of the respective selected element, where the summation is unique for any permutation of a selected element set. In one example, the index can be determined by computing $$I(S) = \sum_{k=1}^{M} \binom{P_k}{k},$$

wherein I(S) is the index, S is a binary sequence denoting selected subbands, M is the total number of selected subbands, k is a selection occurrence count of a selected subband and $P_k$ is a subband position count in the binary sequence for a selected subband corresponding to k. Further, the index can be transmitted to enable the establishment of a communication link in accordance with the selected signal options.

Other implementations are directed to methods for receiving control information to permit the establishment of a communication link. Here, an index that is an indication of a vector including one or more selected elements representing one or more signal options selected from a plurality of available signal options can be received. Similar to the methods for transmitting control information, the vector can be represented as a sequence, which can be a binary sequence, and the elements of the vector can be represented as sequence positions. Moreover, the index can be dependent upon the products of the value of each element with a value of a worth function for the element that is dependent on a selection occurrence count of the element and on an element position count of the element. Alternatively or additionally, the index can be a summation of worth function values, where a particular worth function value is dependent on a selection occurrence count of a particular selected sequence position and a sequence position count of the particular selected sequence position. In addition, the vector can be determined from the index and data signals can be transmitted or received in accordance with the one or more selected signals options.

An alternative implementation is directed to a transmitter system. The system can include an indexing module that is configured to determine an index for a binary sequence including one or more selected bit positions representing one or more subbands selected from a plurality of available subbands. The index can be a summation of choose function values, where any particular choose function is defined by a selection occurrence count of a particular selected bit position that is chosen from a bit position count of the particular selected bit position. The system can further include a transmitter that is configured to transmit the index to enable the establishment of a communication link on the one or more selected subbands.

An alternative implementation is directed to a receiver system. The system can include a receiver that is configured to receive an index that is an indication of a sequence including one or more sequence positions representing one or more signal options selected from a plurality of available signal options. The index can be a summation of worth function values, where a particular worth function value is dependent on a selection occurrence count of a particular selected sequence position and a sequence position count of the particular selected sequence position. The system can further include a decoding module that is configured to determine the sequence from the index to permit the establishment of a communication link in accordance with the one or more selected signal options.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Systems and methods that permit efficient encoding and decoding of various control signals for the identification and proper setup of a communication link are disclosed. Such control signals can be utilized in wired and/or wireless systems and can include information indicating modulation format, coding rate, precoding index, assigned subbands, etc. It should also be noted that the approaches described herein meet the current orthogonal frequency division multiplexing (OFDM) based standards, such as the Institute of Electrical and Electronics Engineers (IEEE) 802.16m standard or Long Term Evolution (LTE) advanced standard, where a subset of tones are selected, properly indexed and then signaled to the receiver.

Exemplary embodiments described herein below provide simple and efficient means for indexing and reversing indexing a sequence of selected signal options. In particular, the indexing and reverse indexing procedures provide several benefits that render them substantially more efficient than other procedures currently utilized in the art. For example, the indices can be configured so that they are consecutive integers denoting each possible variation of signal option selections. Moreover, if the selected options are configured as binary sequences and sorted numerically in a list, the order of the index parallels the numerical order of the sequences. In addition, a closed form expression can be employed to calculate an index for any sequence denoting signal options or to determine the sequence from the index. Furthermore, the computational complexities of calculating the index for any sequence and the reverse procedure of calculating the sequence from its index are very low. One way in which these benefits are achieved is by employing worth function values to determine indices that are dependent on both the position of a selected element in the sequence and the selection occurrence count of that element value, as discussed further herein below.

Figure 1:
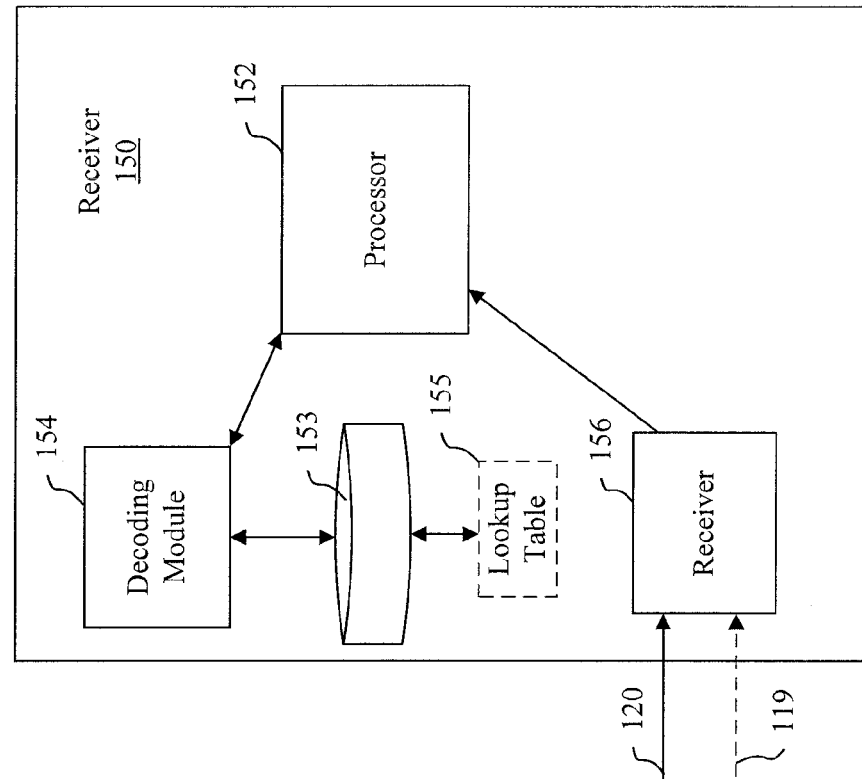
FIG. 1 is a block/flow diagram of an exemplary communication system.
Figure 1:
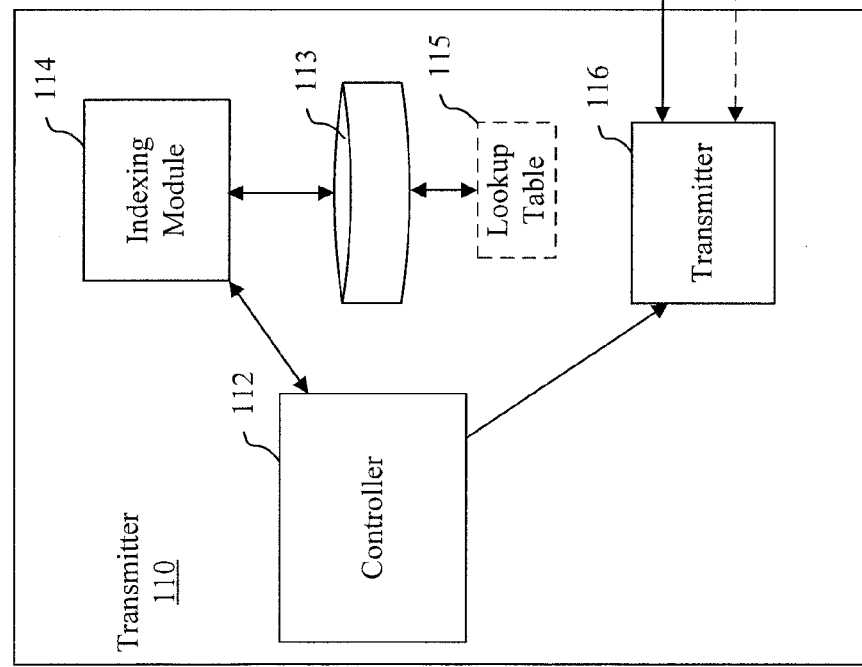

Referring now in detail to the figures in which like numerals represent the same or similar elements and initially to FIG. 1, an exemplary communication system 100 in which various method embodiments described herein can be implemented is illustrated. The system 100 can include a transmitter 110 and a receiver 150, which may communicate via communication links 119 and 120. As indicated above, the communication links 119 and 120 can be wired or wireless. For example, in the wireless scenario, the transmitter 110 can be implemented as a base station in an OFDM system. Alternatively, in the wired scenario, the transmitter 110 can be embodied as an optical terminal that assigns subbands for an optical communication link, which can be implemented as link 120. Furthermore, it should be noted that although only one receiver is shown for purposes of brevity, the system 100 can include a plurality of receivers. Here, the transmitter 110 may comprise a controller 112 that is configured to manage operations at the transmitter. In addition, the controller 112 can be configured to determine information for transmission to the receiver that enables the proper establishment of the communication link 120. Here, the communication link 120 can be used to transmit data, such as, for example, broadcast or multicast data. As stated above, the determined information can comprise selected signal options, including an assigned modulation format, coding rate, precoding index, subbands, etc. In particular, the controller 112 can employ an indexing module 114 to determine an appropriate index that indicates the information which enables the receiver 150 to establish the communication link 120. Operations of the indexing module 114 are discussed in more detail herein below with respect to method embodiments. Further, the controller 112 and the indexing module 114 can utilize a storage medium 113 to aid in determining indices indicating selected signal options. For example, an optional lookup table 115 can be stored in the storage medium 113 and can be employed by the indexing module 114 to determine the indices, as discussed in more detail herein below. In addition, the transmitter system 110 can include a transmitter 116 that can be configured to transmit information to the receiver 120. For example, an initial communication link 119 can be employed to transmit the determined index over, for example, a subband or control channel dedicated for configuration information.

In turn, the receiver system 150 can include a receiver 156 that can be configured to process received signals and decode information transmitted by the transmitter 110. For example, the receiver 156 can include a demodulator and a decoding module. Further, the receiver system 150 can include a processor 152 that can be configured to control operations of the receiver system 150. In particular, the processor 152 can employ a decoding module 154 to decode the index received from the transmitter 110 and thereby determine selected signal options. As indicated above, the selected signal options can be utilized by the receiver 150 to establish the communication link 120. Operations of the decoding module 154 are also discussed in more detail herein below with respect to method embodiments. Further, the processor 152 and the indexing module 114 can utilize a storage medium 153 to decode received indices and thereby determine any corresponding selected signal options. Similar to the indexing module 114 of the transmitter 110, the decoding module 154 can employ an optional lookup table 155 stored in the storage medium 153 to determine the selected signal options, as discussed in more detail herein below.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To illustrate aspects of exemplary embodiments, a set V of vectors $v_i$, i=1, ..., K are considered. Here, elements of the vectors are taken from a finite set of size b. For example, the set can be denoted by F, where F={0, 1, ..., b−1}. In accordance with one exemplary aspect, an index denoting a vector can be found as the summation of the product of the value of each element with its corresponding 'worth function.' The worth function here is a function of both the position of that element in the vector and the occurrence count of that element value from the beginning of the vector. This procedure is different from the conventional approach mentioned above, in which the 'worth function' is just a function of the position of the element in the vector.

For example, a case in which b=2 and a vector $v_1$=[100101] is considered, where there are ones in positions 0, 2 and 5 of the vector. The position index here is counted from zero for the rightmost element of the vector. However, as discussed further herein below, it should be noted that the particular ordering of the elements of the vector is not important. For example, the indexing may start from 1 to N and may also start from the leftmost element position of the vector. It can be assumed that the position of ones are indicated as $P_1 < P_2 < ... < P_M$, where in the above-described example $P_1=0$, $P_2=2$, and $P_3=5$. As stated above, the worth function is a function of the occupancy count k and the actual position $P_k$ rather than just a function of $P_k$ in positional numeral systems. Thus, a worth function in accordance with exemplary aspects is in the form $f(k, P_k)$.

An example of such a worth function is $$f(k, P_k) = \binom{P_k}{k}.$$

This function, for example, can be used to index all possible permutations of a string of length N with M ones and N−M zeros. It turns out that the corresponding index orders all possible permutations in lexicographical order.

One exemplary application in which the indexing procedure can be employed is to index subbands assigned to a receiver for use in communicating with a transmitter. It should be understood, however, that this application is only used as an example. The index can denote any one or more selected signal options from a plurality of available signal options for the communication link between the transmitter and the receiver. Such signal options can comprise, for example, one or more of modulation format, coding rate, precoding index, assigned subbands, etc. Furthermore, any of these types can be combined in an index such that a particular index can indicate several different selection options. For example, the index can indicate both a modulation and coding scheme (MCS), as understood in the art.

In this example, signal option selections can be denoted by a binary sequence of length N where only M positions corresponding to the selected options are one and the rest are zero. For example, with regard to subband signal options, each position in the sequence can correspond to a different subband, where selected subbands to be used by a transmitter and a receiver on a communication link can be denoted by ones and other subbands not used for the link can be denoted by zeros. Such sequences are referred to as SPS (Subband Positions Sequence). In this example, there will be only $$\binom{N}{M}$$

possibilities for SPS out of all $2^N$ possible binary sequences.

It should be understood that a general sequence S is an example of one vector in the set of V vectors mentioned above and can be generally referred to for the various signal options mentioned above. Thus, any reference herein to a sequence position can correspond to an element position of a vector described above. Furthermore, the sequences need not be binary.

The indexing procedure described above provides a simple and efficient way to index such general sequences. For example, in the case where the worth function is given by $$f(k, P_k) = \binom{P_k}{k},$$

the index are efficient in the sense that they are exactly between 0 and $$\binom{N}{M} - 1.$$

Further, if binary sequences are treated as the binary number and sorted numerically, the index shows the order of the sequence in the sorted list. Accordingly, indices for permutations of selected sequence positions are arrangeable in lexicographical order corresponding to a numerical order of the permutations. In addition, for any sequence, there is a closed form expression to calculate the corresponding index. Moreover, the computational complexities of calculating the index for any sequence and the reverse procedure of calculating the sequence from its index are very low.

It should be noted that the indexing procedure described above can be performed on a permuted vector v'=Πv rather than the original vector v. In other words, it is possible to perform the same indexing procedure on a re-ordered vector v. A simple example of such a permutation is one that completely reverses the position of the elements of the vector. For example, if the elements of the vector (of size 1×b) are indexed from 1 to b, then the $k^{th}$ element will be exchanged with the $(b-k+1)^{th}$ element. Thus, it is equivalent to index the vector from N to 1 and the occurrence of each element is counted from the last element of the vector instead of the first element of the vector.

Figure 2:
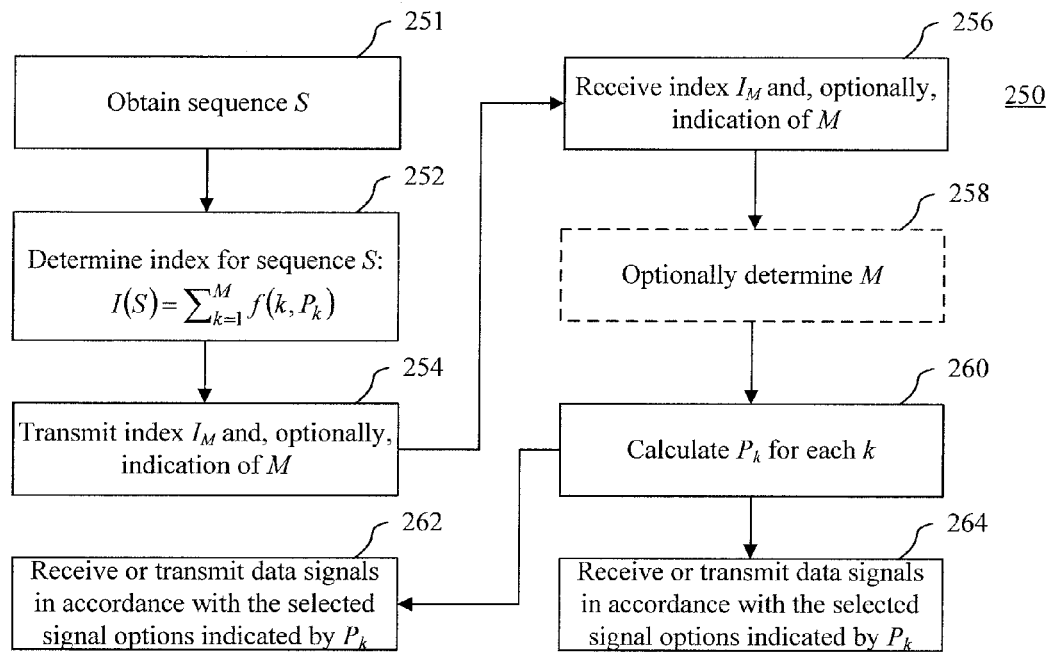
FIG. 2 is a block/flow diagram of an exemplary method for establishing a communication link by employing indexing and reverse indexing procedures.

Referring now to FIG. 2 with continuing reference to FIG. 1, a method 250 for conveying indexing information to a receiver in accordance with an exemplary embodiment is illustrated. The method 200 may begin at step 251, in which the indexing module 114 can obtain a sequence including at least one selected sequence position representing at least one selected signal option from a plurality of available signal options. As stated above, the signal options can comprise at least one of modulation format, coding rate, precoding index or assigned subbands, in addition to other signal options. Furthermore, as indicated above, the sequence can be binary and can have selected sequence or bit positions denoted by ones or zeros. Embodiments in which the selected sequence or bit positions are denoted by zeros are described in more detail herein below. It should be noted that the sequence can be obtained at step 251 in a variety of ways. For example, the controller 112, which can be configured to manage communication links with a plurality of receiver devices, can determine the selected signal options for each of the communication links in accordance with known methods. Here, the indexing module 114 can receive sequences denoting selected bit positions for each of the receivers served by the transmitter 110 from the controller 112. Alternatively, the indexing module 114 can obtain the sequence at step 251 by determining the sequence itself in a similar manner.

At step 252, the indexing module 114 can determine an index for a sequence S. As indicated above, an index denoting a vector representing a sequence can be found as the summation of the product of the value of each element with its corresponding 'worth function':

$$I(S) = \sum_{k=1}^{M} f(k, P_k).$$

Further, as stated above, where the selected sequence positions in a binary sequence are denoted by ones, the summation $$\sum_{k=1}^{M} f(k, P_k)$$

can correspond to a summation of the product of the value of each element of a vector with its corresponding worth function $f(k, P_k)$. Here, such a binary sequence can denote a 1×N vector with M selected elements, wherein the index is determined by summing the products of the value of each element with a value of a worth function for the element. Continuing with the example described above, let $P_k$ denote the $k^{th}$ non-zero position in the sequence where $P_M > \ldots > P_{k+1} > P_k > P_{k-1} > \ldots > P_1$. Thus, any particular value of the worth function $f(k, P_k)$ can be dependent on a selection occurrence count, for example k, of a particular selected sequence position and on a sequence position count, for example $P_k$, for the particular selected sequence position at $P_k$. Here, it is assumed that the positions are indexed from zero for the least significant position to N-1 for the most significant position. However, the indexing of the positions can be from 1 to N and can be varied, as discussed above with regard to vector permutations. As stated above, the worth function can be a choose function $$f(k, P_k) = \binom{P_k}{k},$$

where k is chosen from $P_k$. It should be noted that $$\binom{P_k}{k}$$

is defined to be zero if and only if $P_k < k$, which signifies that it is not possible to choose k elements out of $P_k$ elements.

It should also be noted that although the indexing procedure has been generally described as finding an index as the summation of the product of the value of each element of a vector with its corresponding 'worth function' value, indexing procedures in accordance with exemplary embodiments need not be limited in such a manner. For example, if the elements of a vector denoting a sequence employed ones to denote selected positions of the sequence, then $$I(S) = \sum_{k=1}^{M} f(k, P_k)$$

can be viewed as the summation of a product of the value of each element of the vector with its worth function $f(k, P_k)$. However, the selected or assigned positions can alternatively be denoted by zeros and the other positions can be denoted by ones. In this scenario in which zeros denote the selected positions, $$I(S) = \sum_{k=1}^{M} f(k, P_k)$$

can still hold, where $P_k$ can denote the $k^{th}$ zero position in the sequence and where $P_M > \ldots > P_{k+1} > P_k > P_{k-1} > \ldots > P_1$. Furthermore, in the case where the worth function is given by $$f(k, P_k) = \binom{P_k}{k},$$

the index are also efficient in the sense that they are exactly between 0 and $$\binom{N}{M} - 1.$$

Alternatively, the indexing procedure can remain the same, where $P_k$ can denote the $k^{th}$ nonzero positions in the sequence and where $P_M > \ldots > P_{k+1} > P_k > P_{k-1} > \ldots > P_1$. However, here, in alternative embodiments, the receiver can simply assume that the zero positions in the sequence indicate the selected or assigned positions for the receiver.

At step 254, the controller 112 of the transmitter system 110 can direct the transmitter 116 to transmit the determined index information, which can be denoted as $I_M$, to the receiver system 150 through, for example, the communication link 119. As indicated above, the index can be employed by the receiver system 150 to permit the establishment of the communication link 120 in accordance with the selected signal options. Optionally, the controller 112 can transmit an indication of the total number (M) of elements selected from the N elements of the sequence S, which in turn indicates the total number of selected signal options. For example, a case in which M can be in the range of 2 to 6 is considered. In such a case, three more bits can be added to signal the choice of M. However, it is possible to add only one more bit and still be able to permit the receiver to determine the correct value for M. For example, the controller 112 can use an overflow bit at the position N on top of the regular positions from 0 to N−1. In turn, the receiver 150, at step 258, described below, can initiate the reverse indexing procedure by assuming the largest M, i.e., M=6. If the receiver 150 determines that the most significant bit at position N is not set, then the receiver 150 can determine that M=6. If the receiver 150 determines that the most significant bit at position N is set to one, the receiver 150 can determine that M≦5. Here, the value $$\binom{N}{M} = \binom{N}{6}$$

for the current M=6 should be deducted from the index to generate a new index and it is determined that the value of M is less than or equal to 5, M≦5. The receiver 150 can then repeat the procedure to test and determine if M=5 or M<5 in the same manner until all choices of M are exhausted. For example, if M=4, then the receiver 150 will determine that the overflow bit at position N is zero, indicating that four elements are selected from the N elements of the sequence S. In the generation of the index by the transmitter in 110 for the same example when multiple choices for M exist, for example M=1, 2, . . . , 6, the indexing procedure is as follows. For M=6, i.e., the largest value, the indices are from 0 to $$\binom{N}{6} - 1.$$

For M=5, the indices are then calculated using $$I(S) = \sum_{k=1}^{M} f(k, P_k),$$

as described above, but then the index is added with $$\binom{N}{6},$$

which in turn means $$I(S) = \binom{N}{6} + \sum_{k=1}^{M} f(k, P_k).$$

If M=4, then the same procedure using $$I(S) = \sum_{k=1}^{M} f(k, P_k)$$

as described above is applied to find the index but then it is added with $$\binom{N}{6} + \binom{N}{5},$$

which means $$I(S) = \binom{N}{6} + \binom{N}{5} + \sum_{k=1}^{M} f(k, P_k).$$

In general for any M between 1 and $M_{max}$ the index is calculated as $$I(S) = \sum_{L=M+1}^{M_{max}} \binom{N}{L} + \sum_{k=1}^{M} f(k, P_k).$$

At step 256, the processor 152 of the receiver system 150 can receive the determined index information $I_M$ through the receiver 156 using, for example, the communication link 119.

At optional step 258, the processor 152 of the receiver system 150 can determine the number (M) of elements selected from the N elements of the sequence S. For example, the processor can determine M as discussed above with respect to step 254.

At step 260, the receiver can calculate the selected positions $P_k$ for each value of k in accordance with one or more of a variety of ways, discussed in more detail herein below.

At step 262, the transmitter 116 can transmit or receive data in accordance with the selected signal options at the direction of the controller 112. For example, if the index denotes selected subbands, then data signals can be transmitted or received on the selected subbands in the communication link 120. Similarly, if a selected signal option corresponds to a selected modulation or coding scheme, then the transmitter can transmit or receive data signals on the communication link 120 using the selected modulation and coding scheme to modulate/encode or demodulate/decode the data signals, respectively.

Similarly, at step 264, the receiver 156 can receive or transmit data signals in accordance with the selected signal options at the direction of the processor 152. The communication link 120 can be established and utilized as discussed above with respect to step 262.

Returning to step 260 and referring to FIG. 3, with continuing reference to FIGS. 1 and 2, a method 350 for determining the sequence S from the received index $I_M$ that can be performed to implement step 260 is illustrated. Further, Algorithm 1, provided in Table 1 below, can also be performed by the decoding module 154 of the receiver system 150 to implement the method 350. The worth function $f(k, x)$ can, for example, be the choose function $$\binom{x}{k}.$$

TABLE 1

Algorithm 1

$I_M = I$
for each k = M,M − 1,...2 do
    Find the largest value for x such that $I_k - f(k,x) \geq 0$
    $I_{k-1} = I_k - f(k,x)$
    $P_k = x$
end
$P_1 = I_1$ At step 352, the decoding module 154 of the receiver system 150 can initialize the process and can set $I_M$ to I and k to M.

At step 354, the decoding module 154 can determine whether k has reached the value of 1. If not, then the method 350 can proceed to step 356, in which the decoding module 154 can find the largest value for x such that $I_k - f(k, x) \geq 0$. As stated above, the choose function $$\binom{x}{k}$$

can, for example, be employed as the worth function $f(k, x)$.

At step 358, the decoding module 154 can designate, as a given selected sequence position, the sequence position with the largest sequence position count that renders a given worth function value, for a selection occurrence count denoting the given selected sequence position, less than or equal to an index value. For example, here, for the selected bit or sequence position corresponding to the selection occurrence count k, the decoding module 154 can designate, as the selected bit or sequence position, the sequence position with the largest sequence position count x that renders a given worth function value $f(k, x)$ less than or equal to the index value $I_k$. Accordingly, the decoding module 154 can set $P_k$ to x. In addition, the decoding module 154 may also set $I_{k-1}$ to $I_k - f(k, x)$, and k to k−1. Thus, while the index $I_k$ can be initially set to $I_M$, the index $I_k$ can be reset as the difference between the given worth function value $f(k, P_k)$ and the index $I_M$ through a subtraction operation. Thereafter, the method 350 can proceed to step 354 and can be iterated until k is set to 1. In particular, the designating and the subtraction at step 358 can be iterated for each selected sequence position by utilizing a value of the index resulting from a preceding subtraction iteration. For example, the subtraction, $I_{k-1} = I_k - f(k, x)$, performed after determining the selected sequence position for count k is employed as the index value for determining the following selected sequence position for count k−1. As such, the index value $I_k$ is effectively the difference between the received index $I_M$ and the sum of worth function values $f(j, P_j)$ for j>k.

If the decoding module 154 determines that k is set to 1 at step 354, then the method may proceed to step 360, in which the decoding module 154 sets $P_1$ to $I_1$, at which point all of the selected signal options have been found.

Step 260 and the method 350 can be implemented in a variety of ways. Different exemplary alternatives for implementing step 260 and the method 350 are described herein below with respect to FIGS. 4-6.

Figure 3:
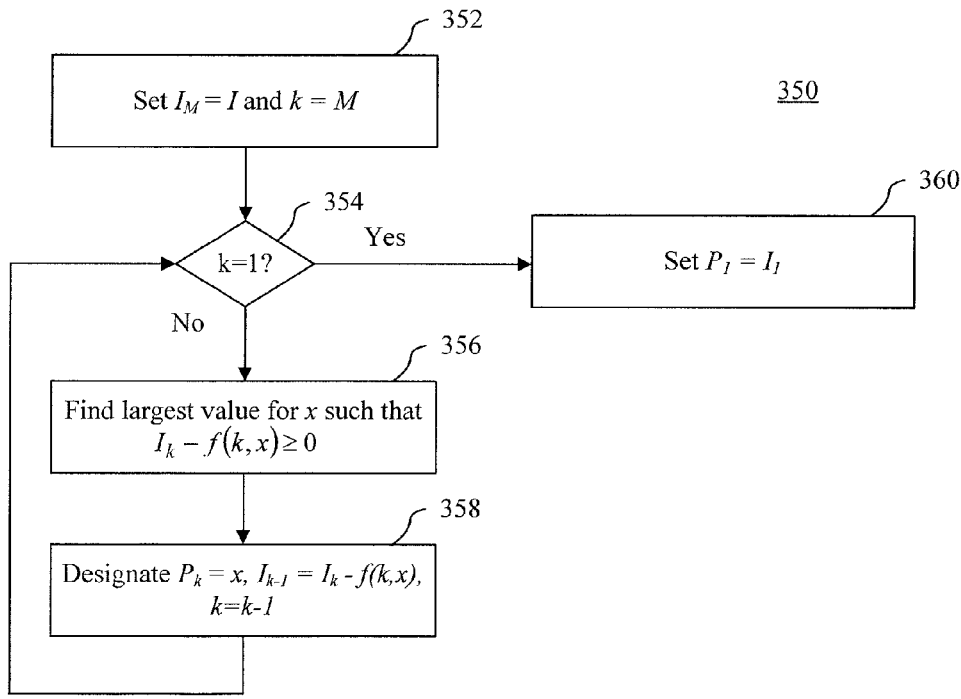
FIG. 3 is a block/flow diagram of an exemplary reverse indexing method.
Figure 4:
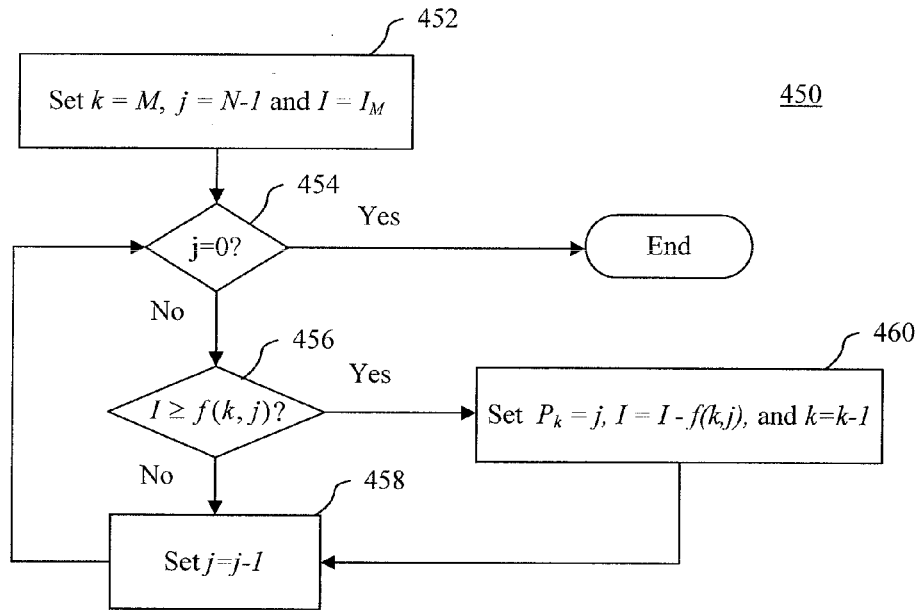
FIG. 4 is a block/flow diagram of an exemplary reverse indexing method that sequentially detects selected sequence positions.
Figure 5:
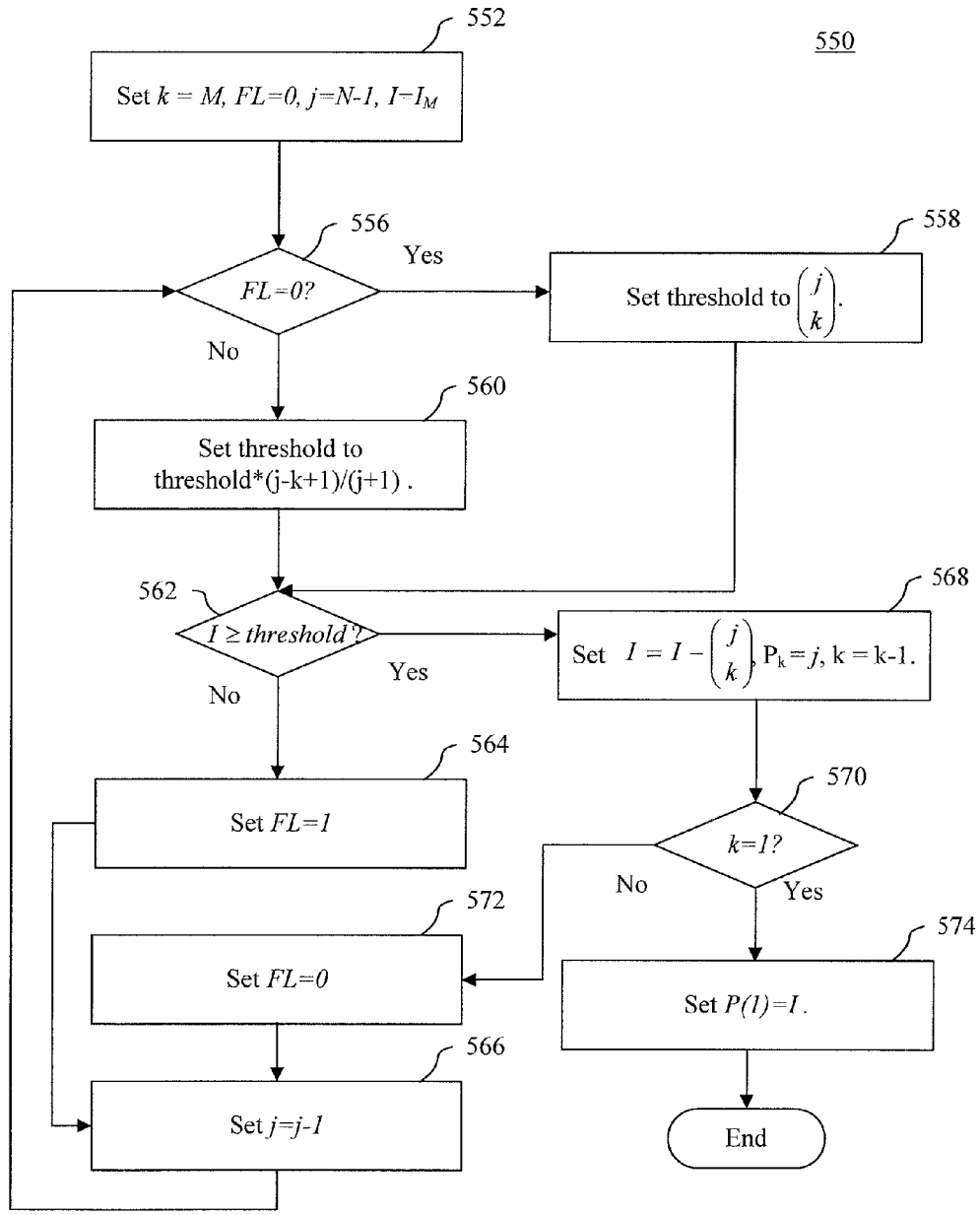
FIG. 5 is a block/flow diagram of an exemplary reverse indexing method that employs characteristics of the choose function to simplify operations.

Referring now to FIG. 4, with continuing reference to FIGS. 1-3, a method 450 for determining the sequence S from the received index $I_M$ that can be performed to implement step 260 and method 350 is illustrated. In accordance with the method 450, the decoding module 154 can sequentially evaluate sequence or bit positions to determine which of the positions are nonzero or selected positions. Performing the sequential detection of the nonzero or selected positions from the most significant position to the least significant position can take advantage of several properties. For example, when the most significant nonzero or selected position is found, the next nonzero or selected position would only be to the right of it. Thus, the decoding module 154 can evaluate only positions that sequentially follow positions that have been found to determine any remaining selected sequence positions. Moreover, it is sufficient to examine positions N, N−1, . . . 0 to determine the selected positions and then terminate the process when all M selected positions are found.

Algorithm 2 provided in Table 2 below can be employed by the decoding module 154 to implement the method 450. The worth function $f(k, j)$ can, for example, be the choose function $$\binom{j}{k}.$$

TABLE 2

Algorithm 2: Sequential Detection Based Procedure k = M;
for each j = (N−1):−1:0 do
    if $I \geq f(k,j)$ then
        $P_k = j$;
        I = I − f(k,j);
        k=k−1;
    end
end At step 452, the decoding module 154 of the receiver system 150 can initialize the process and can set k to M, j to N−1, and I to $I_M$.

At step 454, the decoding module can determine whether j is zero. If not, then the method can proceed to step 456 in which the decoding module 154 can determine whether I is greater than or equal to $f(k, j)$. As stated above, the choose function $$\binom{j}{k}$$

can, for example, be employed as the worth function $f(k, j)$.

If I is less than $f(k, j)$, then the method may proceed to step 458, in which the decoding module 154 can decrement j by one. Thereafter, the method may proceed to step 454 and may be repeated.

If I is greater than of equal to $f(k, j)$, then the method may proceed to step 460, in which the decoding module 154 can set $P_k$ to j, I to $I-f(k, j)$, and k to k−1. Thereafter, the method may proceed to step 458 and can be repeated.

Returning to step 454, if the decoding module 154 determines that j has reached zero, then the method may end.

If the choose function is employed as the worth function, then the method 450 can be modified to reduce the complexity of the process by utilizing particular properties of the binomial (choose) function. For example, referring now to FIG. 5, with continuing reference to FIGS. 1-3, a method 550 for determining the sequence S from the received index $I_M$ that can be performed to implement step 260 and method 350 is illustrated. Similar to the method 450, the nonzero or selected bits can be determined sequentially. However, here, properties of the choose function can be exploited, as threshold values for the comparison of the choose function value with I could be recursively found from the previous threshold value by employing only one multiplication and one division operation. The operations for finding the threshold values are similar to those discussed further herein below with respect to the use of a reduced lookup table. Accordingly, only when the process is started for the new nonzero position is the choose operation performed directly. Considering the fact that the last position can be found directly without performing any choose operation, the total number of times that a choose operation is performed would be M−1. Algorithm 3 provided in Table 3 below can be employed by the decoding module 154 to implement the method 550.

TABLE 3

Algorithm 3: Reduced Complexity Sequential Detection Procedure for Choose Functions

```
k = M;
FL = 0;
for each j = (N − 1) : −1:0 do
    if FL == 0 then
        Threshold = (j k);
    else
        Threshold = Threshold * (j − k + 1)/(j + 1);
    end
    if I ≥ Threshold then
        P_k = j;
        I = I − (j k);
        k = k − 1
        if k == 0 then
            P_1 = I
            Break;
        end
        FL = 0;
    else
        FL = 1;
    end
end
```

The method 550 can begin at step 552, in which the decoding module 154 can set variables k to M, FL to zero, j to N−1 and I to the received index $I_M$.

At step 556, the decoding module 154 can determine whether the variable FL is zero. Here, FL is used to permit the decoding module 154 to determine whether a threshold for comparison with the index should be computed with a choose function operation or through simpler operations, as discussed further herein below.

If the decoding module 154 determines at step 556 that the variable FL is zero, then the method can proceed to step 558, in which the decoding module 154 can set the threshold to $$\binom{j}{k}.$$

If the decoding module 154 determines at step 556 that the variable FL is not zero, then the method can proceed to step 560, in which the decoding module 154 can set the threshold to the product of the value of the preceding threshold with $$\frac{(j-k+1)}{(j+1)}.$$

Here, step 560 permits a recursive determination of the threshold for comparison with an index value for a particular bit position count j by using properties of the choose function. Specifically, the decoding module 154 can apply simple sum, subtraction and division operations as opposed to a choose function operation to determine the threshold.

After step 558 or 560, the method may proceed to step 562 in which the decoding module 154 can determine whether the current index value is greater than or equal to the threshold. If the current index value is less than the threshold, then the method may proceed to step 564, in which the decoding module 154 can set the variable FL to one, indicating that the simpler operations should be performed to determine the next threshold in the following iteration. Accordingly, the recursive computation of steps 562, 564, 566 and 560 can be performed until the selected sequence position for k has been found (i.e. until I is greater than or equal to the threshold in this example). In particular, the decoding module 154 can execute operations other than a choose function operation to perform the recursive computation, thereby reducing complexity of the process. It should be noted that, in effect, the value of the threshold determined at step 560 for a particular sequence position count j and for a particular selection occurrence count k is equal to the choose function value $$\binom{j}{k}.$$

Thus, comparison of the index value I with the threshold can essentially implement the determination of whether a given choose function value is less than or equal to a corresponding index value, as discussed above with respect to step 356 of the method 350.

If the current index value is greater than or equal to the threshold, then the method may proceed to step 568, in which the decoding module 154 can set the variable $P_k$ to j, can decrement I by the choose function value $$\binom{j}{k}$$

and can decrement k by one. The method can proceed to step 570, in which the decoding module 154 can determine whether k is set to 1. If k is set to one, then the method can proceed to step 574 in which $P_1$ is set to the current index value. Thereafter, the method may end, as all values of $P_k$ have been determined. If, at step 570, the decoding module 154 determines that k is not one, then the method may proceed to step 572, in which the decoding module 154 can set the variable FL to zero. Here, an FL value of zero indicates that a choose operation should be performed to determine the next threshold in the following iteration.

After step 572 or 564, the method may proceed to step 566, in which the decoding module 154 can decrement the value of the variable j by one. Thereafter, the method can proceed to step 556 and can be repeated until P(1) is found.

In accordance with other exemplary embodiments, as opposed to sequentially searching for nonzero or selected positions, the selected positions can be searched for and found in a different order. For example, the first nonzero or selected position is known to be somewhere in the position M–1 up to N–1. Here, the evaluation of sequence positions to determine selected sequence positions can begin from the middle of this range such that the comparison with the index is performed with respect to the bit position at the middle of the range. Thereafter, the process can be iterated such that, at each step, the decoding module 154 can divide the range in half until the position of the first nonzero or selected bit is found. When the selected bit is found, then the selected bit can be designated as P(M). The decoding module 154 may then update the residual index $I_{M-1}$, as discussed above with respect to Algorithm 1 and FIG. 3. Subsequently, the second nonzero or selected position would be somewhere in the range of M–2 to P(M). The same procedure discussed above with respect to the first selected or nonzero position can be employed to find the second nonzero position. Similar to the first selected position, the second selected position can be designated as P(M–1) and the residual index $I_{M-2}$ can be updated in the same manner discussed above with regard to algorithm 1 and FIG. 3. At this point, the third nonzero position would be in the range of M–3 to P(M–1). The same procedure can be repeated until the last nonzero position is found. For the last selected bit, no additional computation is necessary, as the residual index $I_1$ directly points to the position of the selected bit. Accordingly, the selected sequence positions can be evaluated and found in a non-sequential order. Algorithm 4 of Table 4, provided below, illustrates one exemplary implementation of searching for selected positions in a non-sequential order. It should be emphasized that, as discussed above, the worth function $f(k, j)$ can be the choose function $$\binom{j}{k}.$$

TABLE 4

Algorithm 4

P = zeros(M + 1);
P(M + 1) = N;
for each k = M : –1:2 do
  up = P(k + 1)–1;
  lo = k – 1;
  while up ≠ lo do TABLE 4-continued Algorithm 4

$j = lo + ceil\left(\frac{up - lo}{2}\right)$; if I ≥ f (k, j) then
      lo = j;
    else
      up = j – 1;
    end
    P(k) = lo
    I = I – f(k,P(k))
end
P(1)=1

Figure 6:
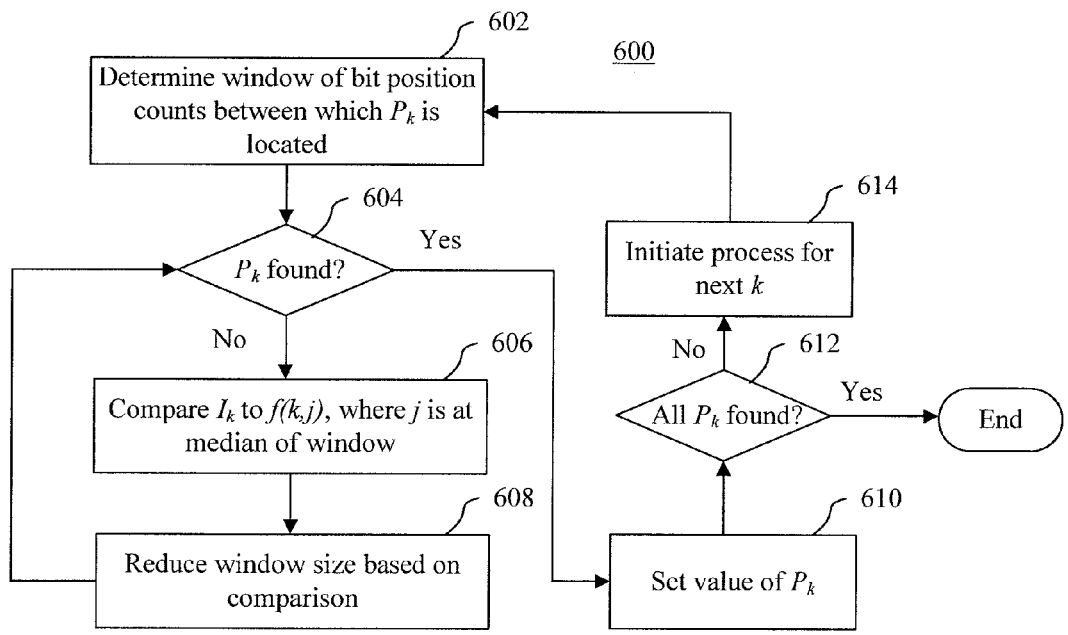
FIGS. 6 and 7 are block/flow diagrams of exemplary reverse indexing methods that detect selected sequence positions by evaluating sequence positions in a non-sequential order.
Figure 7:
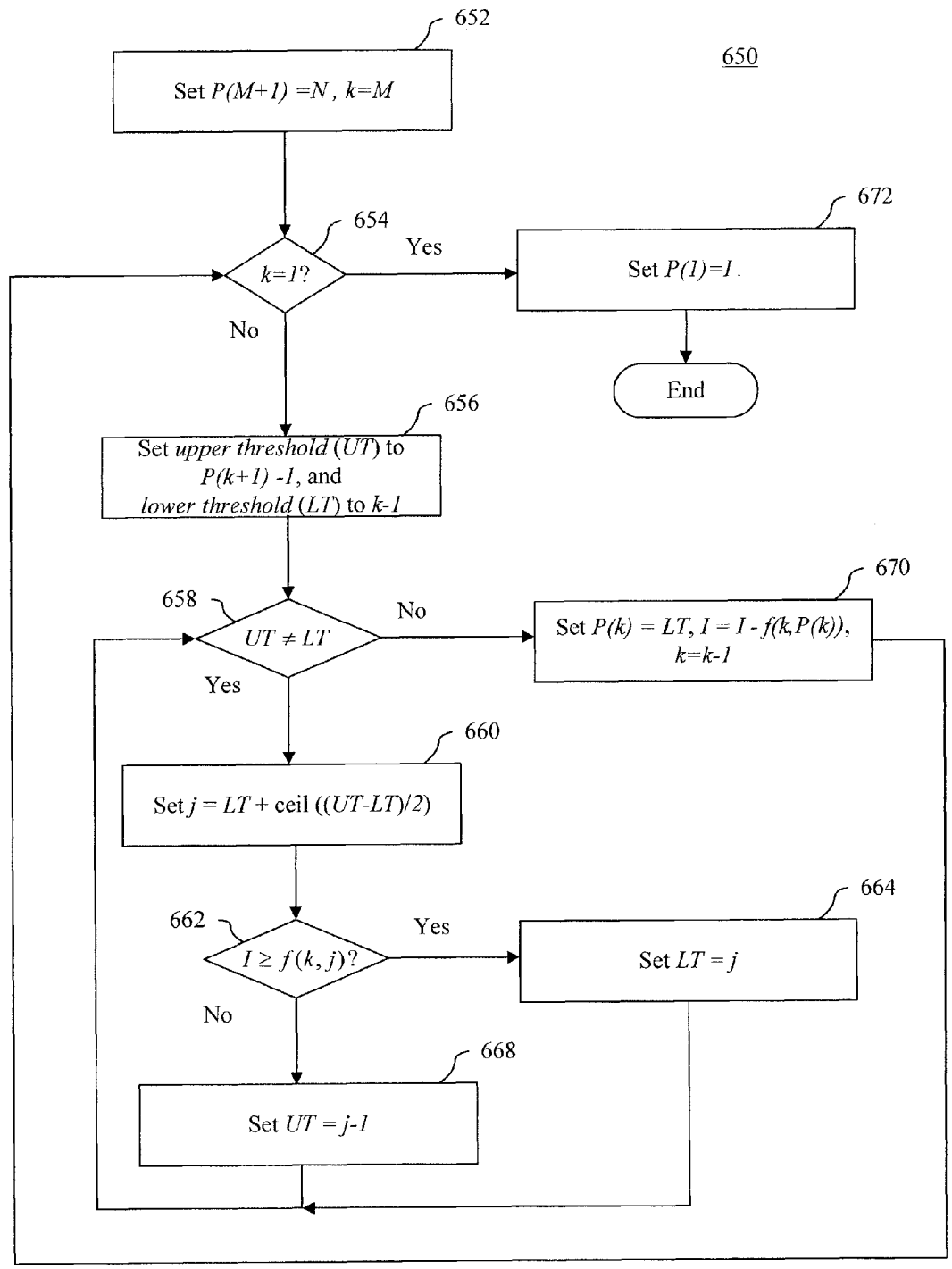

Referring now to FIGS. 6 and 7 with continuing reference to FIGS. 1-3, methods 600 and 650 for determining the sequence S from the received index $I_M$ that can be performed to implement step 260 and method 350 are respectively illustrated. In particular, methods 600 and 650 search for selected bit positions in a non-sequential order. In accordance with exemplary embodiments, Algorithm 4 can be performed by the decoding module 154 to implement method 600 and/or method 650.

Method 600 can begin at step 602, in which the decoding module 154 can determine a window of sequence position counts between which a particular selected sequence position $P_k$ is located. For example, with reference to method 650, illustrating a more specific implementation of the method 600, the decoding module 154 can set the variable P(M+1) to N and can set the variable k to M at step 652. Thereafter, the method 650 can proceed to step 654, in which the decoding module 154 can determine whether k is set to 1. If k is not set to 1, then the method 650 can proceed to step 656, in which the decoding module 154 can determine the window of bit position counts between which a particular selected bit position $P_k$ is located. Specifically, at step 656, the decoding module 154 can set the upper threshold of the window to P(k+1)–1 and the lower threshold of the window to k–1.

At step 604 of the method 600, the decoding module 154 can determine whether the particular selected bit position $P_k$ has been found. For example, at step 658 of the method 650, the decoding module 154 can determine whether the upper threshold does not equal the lower threshold. Here, equality is an indication that the selected bit position $P_k$ has been found.

If $P_k$ has not been found, then the method 600 can proceed to step 606, at which the decoding module 154 can compare the current index value I to the value of the worth function $f(k, j)$, which can be, for example, the choose function $$\binom{j}{k},$$

where j corresponds to the median sequence position count of the window. For example, the method 650 can proceed to step 660 in which the variable j can be set to lower threshold +ceil ((upper threshold–lower threshold)/2). Here, should the average bit position between the upper and lower thresholds of the window not be an integer value, the function "ceil" or ceiling outputs the smallest integer that is not less than the value of the function's argument. In alternative implementations, a "floor" function, which outputs the largest integer that is not greater than the value of the function's argument, can be used in place of the ceiling function. Subsequently, the method 650 can proceed to step 662, in which the decoding module 154 can determine whether the current index value I is greater than or equal to the worth function $f(k, j)$. As stated above, the worth function can, for example, be the choose function $$\binom{j}{k}.$$

At step 608, the decoding module 154 can reduce the window size based on the comparison performed at step 606. For example, for worth functions, such as the choose function, that are employed to determine the index as discussed above with respect to step 252 of FIG. 2, the comparison with index I can indicate whether the correct value of $P_k$ is greater than or less than the median value j. For example, if the current index value I is greater than or equal to the value of the worth function $f(k, j)$, then $P_k$ is greater than the median value j. Similarly, if the current index value I is less than the value of the worth function $f(k, j)$, then $P_k$ is less than the median value j. Thus, based on the comparison, the window can be reduced and in effect shifted towards the correct value of $P_k$. For example, if at step 662 the decoding module 154 determines that the current index value I is greater than or equal to the value of the worth function $f(k, j)$, then the decoding module 154, at step 664, can set the lower threshold to the median value j, thereby shifting the lower boundary of the window towards the upper boundary. If at step 662 the decoding module 154 determines that the current index value I is greater than or equal to the value of the worth function $f(k, j)$, then the decoding module 154, at step 668, can set the upper threshold to j−1, thereby shifting the upper boundary of the window towards the lower boundary.

Thereafter, the comparison and the window size reduction can be iterated until $P_k$ is found. For example, the method 600 can proceed to step 604 and can determine whether $P_k$ is found. If $P_k$ is not found, then the comparison 606 and reduction 608 steps can be repeated. For example, in the method 650, subsequent to steps 664 and 668, the decoding module 154 can proceed to step 658 in which the decoding module 154 can determine whether the upper threshold is equal to the lower threshold. If not, then steps 660-664 or steps 660, 662 and 668 can be performed until the upper threshold is equal to the lower threshold, which, as stated above, is an indication that the selected bit position $P_k$ has been found.

If the selected bit position has been found, as determined at step 604, then the method 600 can proceed to step 610 in which the value of $P_k$ can be set. For example, in the method 650, if the decoding module 154 determines that the upper threshold equals the lower threshold, then the decoding module 154 can designate the bit position corresponding to the thresholds as $P_k$ at step 670. In addition, the decoding module 154 can decrement the current index by the worth function value of $f(k, P_k)$ and can decrement k by 1.

Thereafter, the method 600 can proceed to step 612, in which the decoding module 154 can determine whether all selected bit positions ($P_k$ for all k) have been found. For example, subsequent to step 670 of the method 650, the decoding module 154 can proceed to step 654 and determine whether k is equal to 1. Should k equal 1, then all of the selected bit positions $P_k$ have been found. When k reaches 1, the index value is $P_k$. Thus, when k is 1, the decoding module 154, at step 672, can set $P_1$ to the current index value I and can thereby determine that all $P_k$ have been found. Thereafter, the methods 600 and 650 may end. In the alternative, if, at step 612, the decoding module 154 determines that not all $P_k$ have been found, then the decoding module 154 can initiate the search process for the next selected bit position $P_k$ at step 612 and the method can proceed to step 602 and be repeated until all selected bit positions $P_k$ have been found. For example, if, at step 654, the decoding module 154 determines that k is not 1, then the method 650 can proceed to step 656 in which a new window is set. For example, in the new window, the decoding module 154 can select a sequence or bit position count, P(k+1)−1, that precedes the bit position count, P(k+1), of a previously found selected bit position as an upper-boundary (UT) of the window and can select a sequence position count value, k−1, that precedes a value of the selection occurrence count, k, of the selected bit position $P_k$ that is currently sought as the lower-boundary (LT) of the window. Thereafter, the method can be repeated until all selected bit positions $P_k$ have been found.

It should be noted that because the calculation of the worth function, such as the choose function, can be computationally expensive for large values of k and $P_k$, at least some of the values of the worth function can be stored a priori in a lookup table. This table can be used for both indexing and reverse indexing procedures.

For example, the indexing module 114 of the transmitter system 110 can employ the optional look-up table 115 to determine values of the worth function for summation operations and thereby determine the indices as discussed above with respect to step 252 of the method 200. Similarly, the receiver system 150 can employ the optional look-up table 155 to determine values of the worth function in the various reverse indexing methods discussed above with respect to methods 350-650. For example, the decoding module 154 of the receiver system 150 can employ the optional look-up table 155 to determine values of the worth function for purposes of comparison with the current index values at steps 356, 456, 606 and 662. Accordingly, as discussed further herein below with respect to various exemplary implementations of lookup tables and worth functions, the indexing module 114 and/or the decoding module 154 can utilize a lookup table that cross-references a worth function $f(k, j)$ with corresponding worth function values to determine and employ the values for purposes of computing an index for a vector or determining a corresponding vector from the index.

In general, for counting all possible permutations of M ones and N-M zeros, $$\left(\text{if } M < \frac{N}{2}\right),$$

a table with NM entries can be employed. However, in accordance with various exemplary aspects, several different alternatives for a reduced size table, and/or with reduced computation complexity, can be employed for indexing and reverse indexing procedures.

For example, if a choose function is employed as the worth function, utilizing a table of $$\binom{j}{k}$$

for $1 \le k \le M$ and $k \le j \le N-M+k$ as tables 115 and 155 enables a very fast computation. For example, using the table 155, the decoding module 154 can complete a very fast computation of the sequence S by performing a search operation in a sorted list $$\binom{N}{M}, \binom{N-1}{M}, \ldots, \binom{M}{M}$$

to find the most significant nonzero or selected bit in the sequence S, and thereafter iteratively find the next nonzero or selected position to the right of an already found position. Here, no multiplication is required. Further, by using the search methods discussed above, the upper bound on the number of comparisons to the index value is $$\log_2(N-M) + \sum_{k=M-1}^{1} \log_2(P_{k+1} - k) \leq M \log_2(N-M),$$

which is a quite negligible computational complexity. The minimum size of the table is not more than $(M-1)(N-M)$ integers.

In accordance with other exemplary aspects, the tables 115 and 155 can be implemented as "reduced" lookup tables. Here, the indexing module 114 or the decoding module 154 can compute choose function values from an entry in a lookup table by performing operations other than a worth function operation. For example, for the choose function $$\binom{j}{k},$$

the tables 115 and 155 can be configured to store only M−1 values $$\binom{N-M+k}{k},$$

where k=2, 3, ..., M. For example, with respect to the reverse indexing procedures in which the sequence S is found from the received index by the decoding module 154 discussed above, the search for each nonzero or selected position $P_k$, k=M, M−1, ..., 1, can begin by comparing $$\binom{N-M+k}{k}$$

with 4. Thereafter, worth function values can be computed recursively from one or more entries in the reduced lookup table. For example, the next value $$\binom{N-M+k-1}{k}$$

for comparison with $I_k$ can be obtained by multiplying $$\binom{N-M+k}{k} \text{ by } N - \frac{M}{N-M+k}$$

and the next value $$\binom{N-M+k-2}{k}$$

is obtained by multiplying $$\binom{N-M+k-1}{k} \text{ by } N - M - \frac{1}{N-M+k-1},$$

and so on. In this case, the average operation employed to find each position $P_k$ is $$\frac{N-M}{2}$$

integer multiplication operations and $$\frac{N-M}{2}$$

integer division operations. Thus, the total complexity is in the order of $(M-1)(N-M)$ multiplications and $$\frac{M(N-M)}{2}$$

comparison operations. Indeed, the complexity would usually be much lower for indices structured as discussed above with regard to step 252, because after any nonzero or selected position is found, then the possibilities for the next nonzero or selected position would be more constrained.

Alternatively, other functions can be employed as the worth function. For example, the worth function $f$ described above with respect to methods 250-650 can be a function $f(k, l)$ which has the property, $f(k, l) \geq f(k, l-1) + f(k-1, l-1)$, but is simpler to calculate than the binomial function $$\binom{P(k)}{k}.$$

One example of the function $f(k, l)$ is a function that can be implemented by using a simplified operation, such as summation and shift operation, in place of a multiplication operation. If the function $f(k, l)$ is of relatively low complexity, then it can be directly computed. Otherwise, an alternative approach is to employ a function having a set of outputs that are relatively easier to store in a table, such as tables 115 and/or 155. An example of such a function is one that outputs values that are in the form of a variable power of a prime number. Here, only the value of the variable power can be stored in tables 115 and/or 155 instead of the actual value. Another example is a function that outputs values that are expressible in and that can be stored in the form of $A \times 10^n$, where variable n can be stored directly in tables 115 and/or 155 and A is a constant number that can be stored in one byte, i.e., $0 \leq A \leq 255$.

In accordance with another approach, a function $f(k, l)$ can be designed that is independent of the value of k and only depends on l. Here, the function can be employed as the worth function discussed above with respect to methods 250 and 350. The function $f(k, l)$ in this scenario should have the following properties in order to produce a unique index for any permutation:

for all k, j and l, $f(k, l)=f(j, l)=g(l)$;

for all $$m_j, l_j, 1 \leq j \leq M: g(l_1)+g(l_2)+ \ldots +g(l_j)=g(m_1)+g(m_2)+ \ldots +g(m_j)$$

if and only if $\{l_1, l_2, \ldots, l_j\}=\{m_1, m_2, \ldots, m_j\}$.

The latter property indicates that if the set of $\{g(l), 1 \leq l \leq N\}$ is considered, the summation of every p elements of this set is unique for $1 \leq p \leq M$. Accordingly, if this worth function is employed, the summation of worth function values discussed above with respect to 252 is unique for any permutation of a selected element set ($P_k$ for all k); in other words, each obtainable index value, $$I(S) = \sum_{k=1}^{M} f(k, P_k),$$

from any potential sequence or vector S is unique. The function g(l) now only has N elements instead of MN elements and the indexing module 114 or the decoding module 154 can utilize much less memory to store values g(l) v. l in tables 115 or 155, respectively, for purposes of determining an index from a vector or determining a vector from an index. However, the efficiency of the indexing procedure is lower than the alternative approach discussed above with respect to the function, $f(k, l)$ which has the property $f(k, l) \geq f(k, l-1)+f(k-1, l-1)$. One way to generate the function $f(k, l)=f(j, l)=g(l)$ is to start with $f(0)=0$ and $f(1)=1$ for a particular l. The element $f(k)$ is added as a strict upper bound to any partial summation of size not more than M elements of the set $\{f(0), f(1), \ldots, f(k-1)\}$. This construction ensures that the function retains the two properties described above.

Another approach can be employed as an alternative means for calculating index using the binomial function as the worth function. In particular, one or more values of the worth function can be deduced from one or more entries in the lookup tables. The efficiency of this approach is similar to the approach utilizing the function with the property $f(k, l) \geq f(k, l-1)+f(k-1, l-1)$. In other words, the resulting indices are exactly consecutive integer numbers for each permutation of selected positions. For example, the full table with MN entries with entries for $$\binom{P_k}{k}$$

for $1 \leq k \leq M$ and $1 \leq P_k \leq N$ is considered, where each row of the table is for a fixed value of k. Considering the fact that, for a binomial function $f(k, l)$, $f(k, l)=1$ for k=1, which indicates that there is no need to store the first row of the table for k=1. To generate the table 115 or 155 in this particular approach, an entry from every other column of the table can be removed for each k; in other words, only the odd values of l are kept in the table. In particular, one or more values of the worth function can be deduced from one or more entries in the lookup tables. Using this reduced table, as opposed to performing the binomial function $f(k, l)$ operation directly, the binomial function $f(k, l)$ for even values of l can be computed by performing only one addition of values in the table entries and using the following identity $$f(k,l)=f(k,l-1)+f(k-1,l-1).$$

For even values of l, rendering l−1 to be odd, $f(k, l)$ can be computed from $f(k, l-1)$ and $f(k-1, l-1)$, which are both entries of the reduced table.

This reduction in the size of the table can be easily extended. For example, the table for $f(k, l)$ can include only the entries for which l is in the form of l=3a+1 for some integer value a. In other words, only entries for which the values of l is equal to 1 modulo 3 can be kept in the table. Here, every value of $f(k, l)$ for l=3a+2 can be obtained in a the same manner described above by performing only one addition using the identity $f(k, l)=f(k, l-1)+f(k-1, l-1)$. The values of $f(k, l)$ with l=3a+3 can be similarly obtained by performing two additions and one binary shift operation using the identity $$f(k,l)=f(k,l-2)+2f(k-1,l-2)+f(k-2,l-2)$$

It should be noted that, here, multiplication by two is equivalent to a binary shift operation. In this example, the number of entries of the reduced table is only $$N = \frac{4N - N}{3}.$$

Thus, this example utilizes a reduced table with only N entries stored; the other values of $f(k, l)$ can be obtained without performing any multiplication operations. The memory usage of this example is exactly equal to the approach discussed above with regard to the function g(l), but the efficiency of the indexing is equivalent to the optimal indexing procedure.

It should also be noted that it is possible to reduce the number of entries of the table even further by employing the following identity for the binomial function $f(k, l)$:

$$f(k,l)=f(0,j)f(k,l-j)+f(1,j)f(k-1,l-j)+ \ldots +f(j,j)f(k-j, l-j)$$

However, the above-referenced identity should be written in the form that can be implemented with only addition and binary shift operations in order to reduce the computation complexity. An example for j=3 is provided herein below:

$$T=f(k-1,l-3)+f(k-2,l-3)$$

$$f(k,l)=f(k,l-3)+T+2T+f(k-3,l-3).$$

This calculation utilizes only four addition operations and one shift operation.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transmitting control information to permit the establishment of a communication link comprising:
   determining an index by computing $$I(S) = \sum_{k=1}^{M} \binom{P_k}{k},$$

wherein I(S) is the index, S is a binary sequence denoting selected subbands, M is the total number of selected subbands, k is a selection occurrence count of a selected subband and $P_k$ is a subband position count in the binary sequence for a selected subband corresponding to k; and
   transmitting the index to enable the establishment of a communication link on at least one selected subband.

2. The method of claim 1, wherein the transmitting further comprises transmitting an indication of the total number of selected subbands.

3. The method of claim 1, wherein selected subbands are denoted by ones.

4. The method of claim 1, wherein the bit positions of the binary sequence are indexed from zero for the least significant position to N−1 for the most significant position, wherein N denotes the total number of available subbands.

5. The method of claim 1, wherein $$\binom{P_k}{k}$$

is defined to be zero when $P_k$ is less than k.

6. A method for transmitting control information to permit the establishment of a communication link comprising:
   obtaining a binary sequence including at least one selected bit position representing at least one subband selected from a plurality of available subbands;
   determining an index for the binary sequence as the summation of choose function values, wherein a particular choose function is defined by a selection occurrence count of a particular selected bit position that is chosen from a bit position count of the particular selected bit position; and
   transmitting the index to enable the establishment of a communication link on the at least one selected subband.

7. The method of claim 6, wherein the transmitting further comprises transmitting an indication of the total number of selected subbands.

8. The method of claim 6, wherein selected subbands are denoted by ones.

9. The method of claim 6, wherein the bit positions of the binary sequence are indexed from zero for the least significant position to N−1 for the most significant position, wherein N denotes the total number of available subbands.

10. The method of claim 6, wherein the choose function is defined to be zero when the bit position count of the particular selected bit position is less than the selection occurrence count of the particular selected bit position.

11. A transmitter system comprising:
    an indexing module configured to determine an index for a binary sequence including at least one selected bit position representing at least one subband selected from a plurality of available subbands, wherein the index is a summation of choose function values and wherein any particular choose function is defined by a selection occurrence count of a particular selected bit position that is chosen from a bit position count of the particular selected bit position; and
    a transmitter configured to transmit the index to enable the establishment of a communication link on the at least one selected subband.

12. The system of claim 11, wherein the transmitter is further configured to transmit an indication of the total number of selected subbands.

13. The system of claim 11, wherein selected subbands are denoted by ones.

14. The system of claim 11, wherein the bit positions of the binary sequence are indexed from zero for the least significant position to N−1 for the most significant position, wherein N denotes the total number of available subbands.

15. The system of claim 11, wherein the choose function is defined to be zero when the bit position count of the particular selected bit position is less than the selection occurrence count of the particular selected bit position.

* * * * *